United States Patent
Chai et al.

(10) Patent No.: US 12,493,485 B2
(45) Date of Patent: Dec. 9, 2025

(54) METHOD AND APPARATUS FOR PROCESSING INTERRUPT REQUEST

(71) Applicant: Huawei Technologies Co., Ltd., Shenzhen (CN)

(72) Inventors: Fangming Chai, Dongguan (CN); Wenjing Wang, Shenzhen (CN); Kun Huang, Wuhan (CN)

(73) Assignee: HUAWEI TECHNOLOIGES CO. LTD., Shenzhen (CN)

( * ) Notice: Subject to any disclaimer, the term of this patent is extended or adjusted under 35 U.S.C. 154(b) by 119 days.

(21) Appl. No.: 18/469,069

(22) Filed: Sep. 18, 2023

(65) Prior Publication Data

US 2024/0004695 A1    Jan. 4, 2024

Related U.S. Application Data

(63) Continuation of application No. PCT/CN2022/080992, filed on Mar. 15, 2022.

(30) Foreign Application Priority Data

Mar. 17, 2021    (CN) .......................... 202110284998.2

(51) Int. Cl.
   *G06F 9/48*    (2006.01)
   *G06F 9/52*    (2006.01)

(52) U.S. Cl.
   CPC ............ *G06F 9/4812* (2013.01); *G06F 9/526* (2013.01)

(58) Field of Classification Search
   CPC .............................. G06F 9/4812; G06F 9/526
   See application file for complete search history.

(56) References Cited

U.S. PATENT DOCUMENTS

| 6,792,492 | B1 | 9/2004 | Griffin |
| 8,201,170 | B2 | 6/2012 | Lescouet et al. |
| 9,772,960 | B2 | 9/2017 | Gaiarsa et al. |
| 10,055,369 | B1 * | 8/2018 | Tucker ................. G06F 9/5038 |

(Continued)

FOREIGN PATENT DOCUMENTS

| CN | 1655124 A | 8/2005 |
| CN | 101051281 A | 10/2007 |

(Continued)

OTHER PUBLICATIONS

IBM, Corp., "Selective Dispatch of Queued Tasks," IBM Technical Disclosure Bulletin, vol. 30, No. 5, Armonk, NY, USA, Oct. 30, 1987, pp. 373-374, XP000045238.

(Continued)

*Primary Examiner* — Henry Tsai
*Assistant Examiner* — Harry Z Wang
(74) *Attorney, Agent, or Firm* — Conley Rose, P.C.

(57) ABSTRACT

A method for processing an interrupt request includes: receiving a first interrupt request, where operations that the first interrupt request requests to execute include a first operation, execution of the first operation needs to occupy a critical resource, and the critical resource cannot be simultaneously occupied by a plurality of operations; determining, based on at least the received first interrupt request, that the first operation is an operation that does not need to be executed immediately; and storing the first operation into a temporary storage area.

20 Claims, 8 Drawing Sheets

(56) References Cited

U.S. PATENT DOCUMENTS

| | | | |
|---|---|---|---|
| 10,489,188 B2 | 11/2019 | Udava et al. | |
| 2002/0161957 A1* | 10/2002 | Comeau | G06F 9/485 |
| | | | 710/260 |
| 2003/0046464 A1* | 3/2003 | Murty | G06F 9/4812 |
| | | | 710/260 |
| 2004/0059855 A1* | 3/2004 | Yang | G06F 13/102 |
| | | | 710/260 |
| 2005/0273570 A1* | 12/2005 | DeSouter | G06F 12/1045 |
| | | | 711/170 |
| 2017/0315942 A1* | 11/2017 | Jia | G06F 13/26 |

FOREIGN PATENT DOCUMENTS

| | | |
|---|---|---|
| CN | 101324852 A | 12/2008 |
| CN | 101482833 A | 7/2009 |
| CN | 100535879 C | 9/2009 |
| CN | 101639791 B | 12/2012 |
| CN | 103984537 A | 8/2014 |
| CN | 108282819 A | 7/2018 |
| CN | 109522099 A | 3/2019 |
| CN | 105579963 B | 10/2019 |
| CN | 111338777 A | 6/2020 |
| CN | 111414626 A | 7/2020 |
| CN | 107003899 B | 10/2020 |
| WO | 2009095812 A1 | 8/2009 |

OTHER PUBLICATIONS

Liu Nian, "Design and Development of Distributed Flight Control System Software for Unmanned Helicopter" Nanjing University of Aeronautics and Astronautics The Graduate School College of Automation Engineering, A Thesis in Control Engineering, Mar. 2019, with English abstract, total 90 pages.

* cited by examiner

METHOD AND APPARATUS FOR PROCESSING INTERRUPT REQUEST

CROSS-REFERENCE TO RELATED APPLICATIONS

This is a continuation of International Patent Application No. PCT/CN2022/080992 filed on Mar. 15, 2022, which claims priority to Chinese Patent Application No. 202110284998.2 filed on Mar. 17, 2021. The disclosures of the aforementioned applications are hereby incorporated by reference in their entireties.

TECHNICAL FIELD

This disclosure relates to the computer field, and in particular, to a method and an apparatus for processing an interrupt request.

BACKGROUND

In a system software, a system is forbidden from responding to an interrupt request when processing some data. Reception of an interrupt request needs to be disabled before these data is processed.

After disabling reception of an interrupt request, the system cannot respond to an external event in time, which affects timeliness of responding to the external event by the system. Limited by duration for processing these data, duration for disabling reception of an interrupt request is uncertain. Therefore, how to improve timeliness of responding to the external event by the system becomes an urgent technical problem to be resolved.

SUMMARY

This disclosure provides a method for processing an interrupt request. Through defining a temporary storage area for temporarily storing an operation, responding to an external interrupt event in time, and storing an operation in an interrupt that does not need to be executed immediately into the temporary storage area, disabling reception of an interrupt request is prevented, and timeliness of responding to an external event by a system is improved.

According to a first aspect, a method for processing an interrupt request is provided. The method for processing an interrupt request may be performed by a processor, or may be performed by a chip or a circuit disposed in the processor. This is not limited in this disclosure.

The method for processing an interrupt request includes receiving a first interrupt request, where the first interrupt request is for requesting to execute a first operation, requesting to execute a first operation includes requesting to occupy a critical resource, and the critical resource cannot be simultaneously occupied by a plurality of operations, and determining, based on at least the first interrupt request, that the first operation is an operation that does not need to be executed immediately, and storing the first operation into a temporary storage area, where the temporary storage area is configured to store an operation that occupies the critical resource and that a received interrupt request requests to execute.

According to the method for processing an interrupt request provided in this embodiment of this disclosure, when the operation that a received interrupt request requests to execute in the interrupt includes the first operation that needs to occupy the critical resource, the first operation that does not need to be executed immediately may be stored into the temporary storage area. This prevents the system from disabling reception of an interrupt request, and enables the system to respond to an external interrupt event in time, thereby improving timeliness of responding to an external event by the system.

With reference to the first aspect, in some implementations of the first aspect, before receiving a first interrupt request, the method further includes executing a second operation, where executing a second operation includes occupying the critical resource, and determining, based on at least the first interrupt request, that the first operation is an operation that does not need to be executed immediately, and storing the first operation into a temporary storage area further includes determining, based on a mutual exclusion flag that is set in an operating system, that the first operation cannot be executed immediately, and storing the first operation into the temporary storage area, where the mutual exclusion flag indicates that the critical resource is occupied.

In a possible implementation, when a second operation that is being executed in the system occupies the critical resource, so that the first operation cannot be executed immediately, a mutual exclusion flag may be set. Based on the mutual exclusion flag, it is determined to store the first operation into the temporary storage area. This prevents the system from disabling reception of an interrupt request, and enables the system to respond to an external interrupt event in time, thereby improving timeliness of responding to an external event by the system.

With reference to the first aspect, in some implementations of the first aspect, determining, based on at least the first interrupt request, that the first operation does not need to be executed immediately, and storing the first operation into a temporary storage area further includes determining, based on a context corresponding to the first interrupt request being a first interrupt context, to store the first operation into the temporary storage area.

In another possible implementation, when it is determined that a context corresponding to a received interrupt request is an interrupt context, it may be considered that the first operation does not need to be executed immediately. Based on the interrupt context, it is determined to store the first operation into the temporary storage area. This prevents the system from disabling reception of an interrupt request, and enables the system to respond to an external interrupt event in time, thereby improving timeliness of responding to an external event by the system.

With reference to the first aspect, in some implementations of the first aspect, before executing a second operation, the method further includes determining that the mutual exclusion flag is not set in the operating system, and disabling task preemption and setting the mutual exclusion flag.

According to the method for processing an interrupt request provided in this embodiment of this disclosure, to determine, for mutually exclusive operations, whether a critical resource in a current system is occupied, the mutual exclusion flag is set to indicate that the critical resource is occupied when an operation occupies the critical resource.

With reference to the first aspect, in some implementations of the first aspect, after executing a second operation, the method further includes reading and executing at least one operation temporarily stored in the temporary storage area, where the at least one operation includes the first operation, and clearing the mutual exclusion flag and enabling the task preemption when the temporary storage area includes no operation.

According to the method for processing an interrupt request provided in this embodiment of this disclosure, the mutually exclusive operations may be processed by serial processing.

With reference to the first aspect, in some implementations of the first aspect, the first interrupt request is further for requesting to execute a third operation, the third operation is an operation other than the first operation, and the method further includes executing the third operation, and when executing the third operation ends, determining to return a second interrupt context corresponding to a second interrupt request or determining to return a task context, where a priority of the second interrupt request is lower than a priority of the first interrupt request, and when determining to return the task context and the task context indicates that the executed operation does not occupy the critical resource, the method further includes setting a mutual exclusion flag, reading and executing at least one operation temporarily stored in the temporary storage area, where the at least one operation includes the first operation, and clearing the mutual exclusion flag when the temporary storage area includes no operation.

According to the method for processing an interrupt request provided in this embodiment of this disclosure, when the context is an interrupt context, it is necessary to determine whether to return a low-priority interrupt or to return a task when a high-priority interrupt ends.

With reference to the first aspect, in some implementations of the first aspect, the method further includes receiving a task request, where the task request is for requesting to execute a fourth operation, and requesting to execute a fourth operation includes requesting to occupy the critical resource, and determining, based on a context corresponding to the task request being a task context, to disable task preemption and set the mutual exclusion flag, and executing the fourth operation, where the mutual exclusion flag indicates that the critical resource is occupied, and after executing the fourth operation ends, the method further includes reading and executing at least one operation temporarily stored in the temporary storage area, and clearing the mutual exclusion flag when the temporary storage area includes no operation.

With reference to the first aspect, in some implementations of the first aspect, before setting a mutual exclusion flag, the method further includes obtaining a spin lock, wherein the spin lock is configured to prevent a plurality of processors from performing parallel processing.

According to the method for processing an interrupt request provided in this embodiment of this disclosure, when determining, based on whether the context is an interrupt context, whether to temporarily store an operation, the method may be applied to a multi-core system by obtaining a spin lock.

With reference to the first aspect, in some implementations of the first aspect, reading and executing at least one operation in the temporary storage area includes disabling reception of an interrupt request, determining that the temporary storage area temporarily stores the at least one operation, reading a fifth operation from a first temporary storage area, enabling reception of an interrupt request, and executing the fifth operation, where the fifth operation is one of the at least one operation.

With reference to the first aspect, in some implementations of the first aspect, storing the first operation into a first temporary storage area includes disabling reception of an interrupt request, determining that the temporary storage area is not full, storing the first operation into the first temporary storage area, and enabling reception of an interrupt request.

According to the method for processing an interrupt request provided in this embodiment of this disclosure, duration for temporarily storing an operation and duration for reading an operation from the temporary storage area are very short, thereby ensuring timeliness of responding to an external event by the system.

With reference to the first aspect, in some implementations of the first aspect, a structure of the temporary storage area includes any one of the following: a linked list structure, a heap structure, or a queue structure.

According to the method for processing an interrupt request provided in this embodiment of this disclosure, temporarily storing an operation may be implemented in a plurality of manners, thereby improving flexibility of the solution.

According to a second aspect, an apparatus for processing an interrupt request is provided, including a receiving unit configured to receive a first interrupt request, where the first interrupt request is for requesting to execute a first operation, requesting to execute a first operation includes requesting to occupy a critical resource, and the critical resource cannot be simultaneously occupied by a plurality of operations, and a processing unit configured to determine, based on at least the first interrupt request, that the first operation is an operation that does not need to be executed immediately, and store the first operation into a temporary storage area, where the temporary storage area is configured to store an operation that occupies the critical resource and that a received interrupt request requests to execute.

With reference to the second aspect, in some implementations of the second aspect, before the receiving unit receives the first interrupt request, the apparatus further includes an execution unit configured to execute a second operation, where executing a second operation includes occupying the critical resource, where that a processing unit is configured to determine, based on at least the first interrupt request, that the first operation does not need to be executed immediately, and store the first operation into a temporary storage area further includes the processing unit determines, based on a mutual exclusion flag that is set in an operating system, that the first operation cannot be executed immediately, and stores the first operation into the temporary storage area, where the mutual exclusion flag indicates that the critical resource is occupied.

With reference to the second aspect, in some implementations of the second aspect, that a processing unit is configured to determine, based on at least the first interrupt request, that the first operation does not need to be executed immediately, and store the first operation into a temporary storage area further includes the processing unit is configured to determine, based on a context corresponding to the first interrupt request being a first interrupt context, to store the first operation into the temporary storage area.

With reference to the second aspect, in some implementations of the second aspect, before the execution unit executes the second operation, the processing unit is further configured to determine that the mutual exclusion flag is not set in the operating system, and the processing unit is further configured to disable task preemption and set the mutual exclusion flag.

With reference to the second aspect, in some implementations of the second aspect, after execution of the second operation by the execution unit ends, the processing unit is further configured to read and execute at least one operation temporarily stored in the temporary storage area, where the at least one operation includes the first operation, and the processing unit is further configured to clear the mutual exclusion flag and enable the task preemption when the temporary storage area includes no operation.

With reference to the second aspect, in some implementations of the second aspect, the first interrupt request is further for requesting to execute a third operation, the third operation is an operation other than the first operation, and the apparatus further includes an execution unit configured to execute the third operation, where when execution of the third operation ends, the processing unit is further configured to determine to return a second interrupt context corresponding to a second interrupt request or determine to return a task context, where a priority of the second interrupt request is lower than a priority of the first interrupt request, and when the processing unit determines to return the task context and the task context indicates that the executed operation does not occupy the critical resource, the processing unit is further configured to set a mutual exclusion flag, read and execute at least one operation temporarily stored in the temporary storage area, where the at least one operation includes the first operation, and clear the mutual exclusion flag when the temporary storage area includes no operation.

With reference to the second aspect, in some implementations of the second aspect, the receiving unit is further configured to receive a task request, where the task request is for requesting to execute a fourth operation, and requesting to execute a fourth operation includes requesting to occupy the critical resource, and determine, based on a context corresponding to the task request being a task context, to disable task preemption and set the mutual exclusion flag, and execute the fourth operation, where the mutual exclusion flag indicates that the critical resource is occupied, and after execution of the fourth operation ends, the processing unit is further configured to read and execute at least one operation temporarily stored in the temporary storage area, and clear the mutual exclusion flag when the temporary storage area includes no operation.

With reference to the second aspect, in some implementations of the second aspect, before the processing unit sets the mutual exclusion flag, the apparatus further includes an obtaining unit configured to obtain a spin lock, where the spin lock is configured to prevent a plurality of processors from performing parallel processing.

With reference to the second aspect, in some implementations of the second aspect, that the processing unit reads and executes at least one operation in the temporary storage area includes the processing unit disables reception of an interrupt request, the processing unit determines that the temporary storage area temporarily stores the at least one operation, the processing unit reads a fifth operation from a first temporary storage area, the processing unit enables reception of an interrupt request, and the processing unit executes the fifth operation, where the fifth operation is one of the at least one operation.

With reference to the second aspect, in some implementations of the second aspect, that a processing unit stores the first operation into a first temporary storage area includes the processing unit disables reception of an interrupt request, the processing unit determines that the temporary storage area is not full, the processing unit stores the first operation into the first temporary storage area, and the processing unit enables reception of an interrupt request.

According to a third aspect, an apparatus for processing an interrupt request is provided. The apparatus for processing an interrupt request includes a processor configured to implement the method described in the first aspect.

In a possible implementation, the apparatus for processing an interrupt request may further include a memory, the memory is coupled to the processor, and the processor is configured to implement the method described in the first aspect.

In a possible implementation, the memory is configured to store program instructions and data. The memory is coupled to the processor, and the processor may invoke and execute the program instructions stored in the memory, to implement the method described in the first aspect.

In a possible implementation, the apparatus for processing an interrupt request may further include a communication interface, and the communication interface is used by the apparatus for processing an interrupt request to communicate with another device. The communication interface may be a transceiver, an input/output interface, a circuit, or the like.

In a possible design, the apparatus for processing an interrupt request includes a processor and a communication interface.

The processor communicates with external through the communication interface.

The processor is configured to run a computer program, to enable the apparatus for processing an interrupt request to implement any method described in the first aspect.

It may be understood that the external may be an object other than the processor or an object other than the apparatus.

In another possible design, the apparatus for processing an interrupt request is a chip or a chip system. The communication interface may be an input/output interface, an interface circuit, an output circuit, an input circuit, a pin, a related circuit, or the like on the chip or the chip system. The processor may alternatively be embodied as a processing circuit or a logic circuit.

According to a fourth aspect, this disclosure provides a computer-readable storage medium. The computer-readable storage medium stores instructions. When the instructions run on a computer, the computer is enabled to perform the method in the first aspect.

According to a fifth aspect, this disclosure provides a computer program product including instructions. When the computer program product is run on a computer, the computer is enabled to perform the method in the first aspect.

According to a sixth aspect, a communication system is provided. The communication system includes the apparatus for processing an interrupt request shown in the second aspect.

According to a seventh aspect, a chip or a chip system is provided. The chip or the chip system includes at least one processor and a communication interface. The communication interface and the at least one processor are interconnected through a line. The at least one processor is configured to run a computer program or instructions, to perform the method in any possible implementation of the first aspect. The communication interface in the chip may be an input/output interface, a pin, a circuit, or the like.

In a possible implementation, the chip or the chip system described above in this disclosure further includes at least one memory, and the at least one memory stores instructions. The memory may be a storage unit inside the chip, for example, a register or a cache. Alternatively, the memory may be a storage unit of the chip (for example, a read-only memory (ROM), a random-access memory (RAM), and the like).

DESCRIPTION OF EMBODIMENTS

The following describes technical solutions of this disclosure with reference to the accompanying drawings.

The technical solutions in embodiments of this disclosure may be applied to various system software, for example, an operating system, a language handler, a database management system, and an auxiliary program. The operating system manages hardware devices of a computer, so that application software can use the hardware devices conveniently and efficiently. A common operating system on a microcomputer includes a disk operating system (DOS), a WINDOWS operating system, a multi-user computer operating system (e.g., LINUX), an operating system (OS), and the like. The language handler includes an assembly language assembler, a C language compiler, a linker, and the like. The database management system stores a large amount of data in an organized and dynamic manner. The database management system is large-scale software for operating and managing databases, and is configured to establish, use, and maintain databases. The auxiliary program is also referred to as "a software development tool", "support software", and "a software tool", and mainly includes an editor, an equipment linker, and a debugger.

Figure 1:
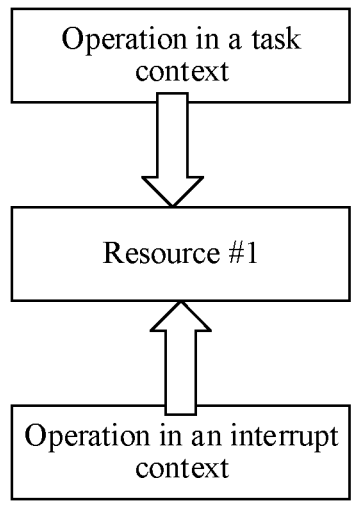
FIG. 1 is a schematic diagram of an application scenario of a technical solution according to an embodiment of this disclosure.

FIG. 1 is a schematic diagram of an application scenario of a technical solution according to an embodiment of this disclosure. As shown in FIG. 1, two operations that need to be executed respectively in a task context and an interrupt context both need to occupy a resource #1. However, the two operations that need to be executed respectively in the task context and the interrupt context cannot occupy the resource #1 simultaneously. In this case, mutual exclusion occurs. To enable the two operations that need to be executed respectively in the task context and the interrupt context to be executed smoothly, the two operations that need to be executed respectively in the task context and the interrupt context do not occupy the resource #1 simultaneously. The two operations are considered as two mutually exclusive operations.

It should be understood that FIG. 1 illustrates merely an example of a scenario in which two operations that need to be executed respectively in the task context and the interrupt context are mutually exclusive. In embodiments of this disclosure, there is no specific limitation on the number of operations in the task context and the number of operations in the interrupt context that are mutually exclusive. Two or more operations in the task context and two or more operations in the interrupt contexts cannot occupy a resource simultaneously. In other words, a mutual exclusion scenario may occur between a plurality of operations. This is not limited in this disclosure.

It should be further understood that FIG. 1 is merely described by using an example in which an operation in the task context and an operation in the interrupt context are mutually exclusive. Mutually exclusive operations in embodiments of this disclosure may alternatively be an operation in an interrupt context corresponding to a low-priority interrupt and an operation in an interrupt context corresponding to a high-priority interrupt that are mutually exclusive.

Further, for a concept that operations that need to be executed respectively in the task context and the interrupt context are mutually exclusive, refer to descriptions in the related technologies. Details are not described in this disclosure.

A solution to a problem that at least two operations are mutually exclusive is that, when an operation in the task context or the interrupt context is executed, an interrupt is disabled (or reception of an interrupt request is disabled), the operation is executed, and the interrupt is enabled (or reception of an interrupt request is enabled). Limited by duration for handling the operation, duration for disabling reception of an interrupt request is uncertain. The system cannot respond to an external event in time, which affects timeliness of responding to an external event by the system.

For ease of understanding embodiments of this disclosure, several basic concepts in embodiments of this disclosure are briefly described. It should be understood that the basic concepts described below are briefly described by using basic concepts specified in a system software as an example, but embodiments of this disclosure are not limited to being applied only to existing system software. Therefore, a specific name of a term that appears when the system software is used as an example for description is not limited, and the term may be correspondingly extended to other system software, for example, future system software.

1: Mutually Exclusive Operations.

The mutually exclusive operations in embodiments of this disclosure include an operation that needs to be executed in a task context and an operation that needs to be executed in an interrupt context between which resource contention occurs, or an operation that needs to be executed in a low-priority interrupt context and an operation that needs to be executed in a high-priority interrupt context between which resource contention occurs.

To be specific, for a system resource, when an operation of the mutually exclusive operations occupies the resource, another operation that needs to occupy the resource needs to wait, and the mutually exclusive operations cannot occupy the resource simultaneously. An operation in the task context and an operation in the interrupt context may be referred to as mutually exclusive operations.

Executing mutually exclusive operations in embodiments of this disclosure may be understood as executing an operation of the mutually exclusive operations. For example, if a first operation in the task context and a second operation in the interrupt context are mutually exclusive, either executing the first operation or executing the second operation may be referred to as executing mutually exclusive operations.

2: Interrupt.

An interrupt means that during running of a computer, a processor can automatically suspend a running program and transfer to a program that handles a new situation when the processor needs to intervene in the situation. After the handling ends, the processor returns to continue running the suspended program. An interrupt can be understood as a response to an interrupt request.

3: Interrupt Context and Task Context.

In an operating system, there are two different contexts: a task context and an interrupt context. There is no task context but an interrupt context in the interrupt, so that sleep cannot occur in the interrupt context, that is, task switching cannot occur in the interrupt context.

In embodiments of this disclosure, the task context may also be referred to as a process context, a thread context, or the like. A "task", a "process", and a "thread" mentioned below can be replaced with each other.

(1) Preceding context of a process: A value in a central processing unit (CPU) register in a user mode, a process status, and content on a stack that need to be saved when a process is switched from the user mode to a kernel mode, that is, a process context of the current process. Therefore, when the process is executed again, the state during the switching can be restored and the process continues to be executed.

(2) Following context of a process: A program that is executed after switching to the kernel mode, that is, a part of the process that is run in the kernel space.

(3) Preceding context of an interrupt: Hardware enables, through an interrupt trigger signal, the kernel to invoke an interrupt handler to enter the kernel space. In this procedure, some variables and parameters of the hardware need to be transferred to the kernel, and the kernel performs interrupt handling based on these parameters. The preceding context of the interrupt can be considered as the parameters transferred from the hardware and some other environments that need to be saved by the kernel (which are mainly process environments that are currently interrupted).

(4) Following context of an interrupt: An interrupt service routine that is executed in the kernel space.

Kernel mode: Drivers, interrupt-related programs, kernel schedulers, and memory managing and operating programs are generally executed in the kernel space.

User mode: Space for running user programs.

4: Disabling an Interrupt.

In a single processor, concurrent processes cannot be executed in an overlapped manner but can only be interleaved. A process continues to be executed until the process invokes an operating system service or is interrupted. Therefore, to ensure mutual exclusion, disabling interrupting the process is sufficient. This capability can be achieved through primitives, about disabling and enabling an interrupt, defined by the kernel of the operating system.

Because a critical point cannot be interrupted, mutual exclusion is guaranteed. This approach is costly and has significantly low execution efficiency because the processor is limited by being unable to interleave.

In embodiments of this disclosure, disabling an interrupt may be understood as disabling reception of an interrupt request. The interrupt request may be an interrupt signal (such as an electrical signal) sent outside the system.

5: Disabling Preemption.

Because the kernel is preemptive, a process in the kernel may suspend at any time to facilitate running of another process with a higher priority. This means that a task and a preempted task may run in a same critical region. To avoid this situation, disabling preemption may be set.

In embodiments of this disclosure, disabling preemption may be referred to as disabling task preemption, and enabling preemption may be referred to as enabling task preemption.

6: Linked list.

A linked list is a non-consecutive and non-sequential storage structure on a physical storage unit. A logical order of data elements is implemented by a pointer link order in the linked list.

7: Queue.

A queue is a special linear table. This is because the queue allows a deletion operation to be executed only at the front of the table, but allows an insertion operation to be executed only at the rear of the table. Similar to the stack, the queue is a linear table on which operations are limited. The end at which the insertion operation is executed is referred to as the queue tail, and the end at which the deletion operation is executed is referred to as the queue head.

8: Critical region.

A critical region described in a current software system generally refers to a program segment that accesses a critical resource (for example, a shared device or a shared memory), where the critical resource cannot be accessed by a process context and an interrupt context simultaneously. When the process context enters the critical region, the interrupt context needs to wait, and when the interrupt context enters the critical region, the process context needs to wait, to ensure that the critical resource is occupied in a mutual exclusion manner.

9: Interrupt priority.

To enable the system to respond to and handle all interrupts in time, the system divides interrupt sources, through hardware based on the importance and urgency of interrupt events, into several levels, which are referred to as interrupt priorities.

In an actual system, a situation in which a plurality of interrupt sources request interrupts simultaneously is often encountered. In this case, a CPU needs to determine an interrupt source to be served first and a service sequence. The solution is to prioritize the interrupts in queue. To be specific, based on the importance and urgency of the requests from the interrupt sources, ranks of handling the interrupts prioritized are priorities, also referred to as priority rights. An interrupt request with a highest priority is responded to first. In addition, when being handling an interrupt, the CPU needs to respond to another interrupt request with a higher priority, and shield an interrupt request at a same level or a lower level, so as to form interrupt nesting.

Figure 2:
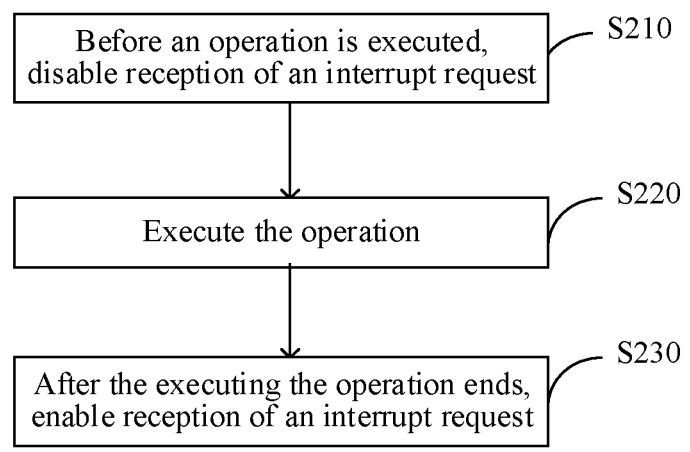
FIG. 2 is a schematic flowchart of executing mutually exclusive operations.

In system software, to prevent resource contention from occurring between an operation that needs to be executed in a task context and an operation that needs to be executed in an interrupt context, and/or to prevent resource contention from occurring between an operation that needs to be executed in a low-priority interrupt context and an operation that needs to be executed in a high-priority interrupt context, before executing an operation that needs to be executed in a task context, (or before executing an operation that needs to be executed in a low-priority interrupt context), the system is disabled from responding to interrupt requests. To be specific, reception of an interrupt request is disabled before handling these operations. After the handling the operations ends, reception of an interrupt request is enabled. For ease of understanding, a procedure of executing an operation that needs to access a critical resource in a system software is described with reference to FIG. 2. FIG. 2 is a schematic flowchart of executing an operation, including the following steps.

S210: Before an operation is executed, disable reception of an interrupt request.

S220: Execute the operation.

Further, executing the operation needs to access a critical resource.

The operation may be an operation that needs to be executed in a task context, or may be an operation that needs to be executed in an interrupt context.

S230: After executing the operation ends, enable reception of an interrupt request.

When an operation is handled by executing the foregoing S210 to S230, resource contention can be prevented from occurring between an operation that needs to be executed in a task context and an operation that needs to be executed in an interrupt context, or resource contention can be prevented from occurring between an operation that needs to be executed in a low-priority interrupt context and an operation that needs to be executed in a high-priority interrupt context.

However, if resource contention is avoided by disabling reception of an interrupt request, the system cannot respond to an external event in time, which affects timeliness of responding to an external event by the system. For example, when duration for handling the operation is T, duration for which the system needs to disable reception of an interrupt request is T. Timeliness of responding to an external event by the system is affected if T is excessively long.

To resolve the problem that exists when an operation that needs to access a critical resource is executed, this disclosure provides a method for processing an interrupt request. By defining a temporary storage area for the operation, and responding to an external interrupt event in time, timeliness of responding to an external event by the system is improved.

Embodiments shown below do not limit a specific structure of an execution body of the method provided in embodiments of this disclosure, provided that communication can be performed according to the method provided in embodiments of this disclosure by running a program that records code of the method provided in embodiments of this disclosure. For example, the method provided in embodiments of this disclosure may be performed by a computer device, or by a function module that is in the computer device and that can invoke and execute the program.

To facilitate understanding of embodiments of this disclosure, the following several points are described.

First, in this disclosure, "indicate" may be understood as "enable", and "enable" may include "directly enable" and "indirectly enable". When information is described as enabling A, it may mean that the information directly enables A or indirectly enables A, but it does not necessarily mean that the information carries A.

Information enabled by the information is referred to as to-be-enabled information. In a specific implementation, the to-be-enabled information may be enabled in many manners. For example, but not limited to, the to-be-enabled information may be directly enabled, such as the to-be-enabled information or an index of the to-be-enabled information. Alternatively, the to-be-enabled information may be indirectly enabled by enabling other information, where there is an association relationship between the other information and the to-be-enabled information. Alternatively, only a part of the to-be-enabled information may be enabled, and other parts of the to-be-enabled information are known or agreed in advance. For example, specific information may be enabled through a pre-agreed (for example, specified in a protocol) sequence of all information, so as to reduce enabling overheads to some extent. In addition, a common part of all information may be identified and enabled in a unified manner, so as to reduce enabling overheads caused by enabling the same information separately.

Second, the first number, the second number, and the like (for example, "#1", "#2", and the like) in this disclosure are merely for ease of description, and for distinguishing objects, but are not intended to limit the scope of embodiments of this disclosure. For example, the first number, the second number, and the like, are for distinguishing different indication information, rather than describing a particular order or sequence. It should be understood that objects described in this way may be interchangeable in proper circumstances, so that solutions other than embodiments of this disclosure can be described.

Third, in this disclosure, "preset" may include predefined, for example, defined in a protocol. The "predefined" may be implemented by saving in advance, in the device, corresponding code, a table, or another format that may be used to indicate related information. A specific implementation of the "predefined" is not limited in this disclosure.

Fourth, "save" in embodiments of this disclosure may mean that saved in one or more memories. The one or more memories may be separately disposed, or may be integrated into an encoder or a decoder, a processor, or a communication apparatus. Alternatively, some of the one or more memories may be separately disposed, and some of the one or more memories may be integrated into a decoder, a processor, or a communication apparatus. A type of a memory may be a storage medium in any form. This is not limited in this disclosure.

Figure 3:
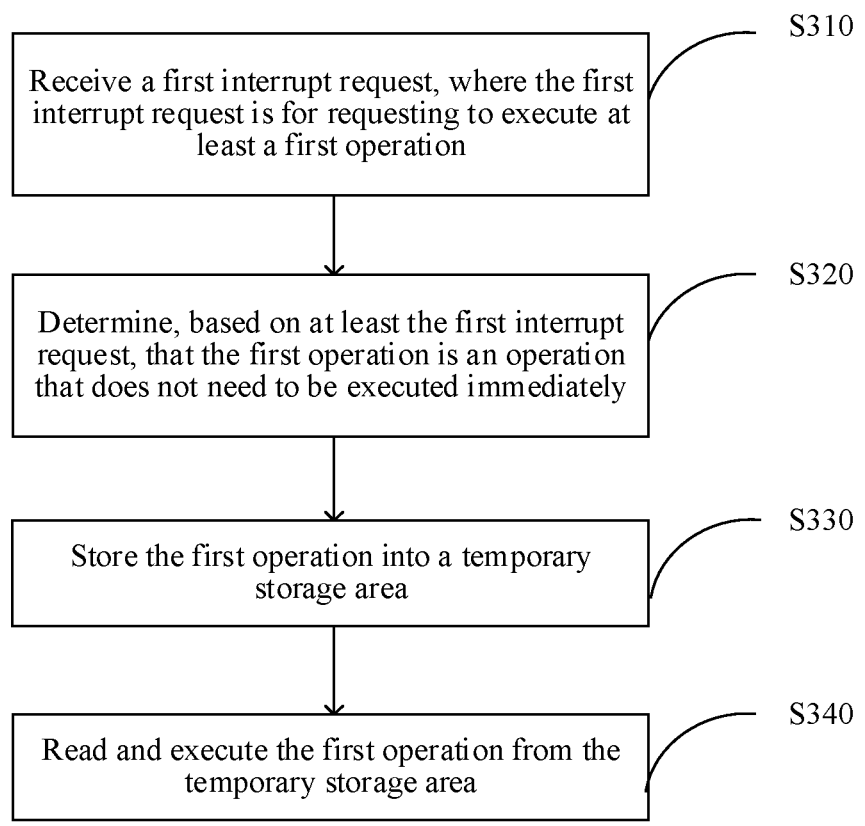
FIG. 3 is a schematic flowchart of a method for processing an interrupt request according to an embodiment of this disclosure.

FIG. 3 is a schematic flowchart of a method for processing an interrupt request according to an embodiment of this disclosure. The method is applied to a software system, and the method includes at least some of the following steps.

S310: Receive a first interrupt request, where the first interrupt request is for requesting to execute at least a first operation.

Further, requesting to execute a first operation includes requesting to occupy a critical resource, but the critical resource cannot be simultaneously occupied by a plurality of operations.

Optionally, the first interrupt request may be referred to as an interrupt signal. A source of the first interrupt request, a triggering manner, and how to determine, after receiving a first interrupt request, a function that needs to be invoked by the first interrupt request are not limited in this embodiment of this disclosure. For details, refer to related descriptions about responding to an interrupt by a system. This embodiment of this disclosure mainly relates to how to process an operation that needs to be executed in an interrupt corresponding to the interrupt request.

In addition, it should be noted that an interrupt in the system may occur at any time, and receiving an interrupt request may be understood as responding to an interrupt request that occurs at any time by the processor.

In the embodiment shown in FIG. 3, the first interrupt request is corresponding to a first interrupt context. If the processor receives the first interrupt request, it may be understood that the processor is located in the first interrupt context. When the processor is located in the first interrupt context, a plurality of operations needs to be executed. Further, in this embodiment of this disclosure, the processor needs to execute the first operation in the first interrupt context, and needs to access the critical resource when executing the first operation.

In the embodiment shown in FIG. 3, after a first interrupt request is received, it can be determined, based on at least the first interrupt request, that the first operation is an operation that does not need to be executed immediately. If the first operation is an operation that does not need to be executed immediately, the first operation may be stored into a temporary storage area. The method procedure shown in FIG. 3 further includes S320 and S330.

S320: Determine, based on at least the first interrupt request, that the first operation is an operation that does not need to be executed immediately.

Further, determining, based on at least the first interrupt request, that the first operation is an operation that does not need to be executed immediately includes the following two possibilities.

Possibility 1: Determine, based on a mutual exclusion flag that is set in an operating system, that the first operation cannot be executed immediately. An operation that cannot be executed immediately may be understood as an operation that does not need to be executed immediately.

When a mutual exclusion flag is set in the system, it indicates that the critical resource in the current system is occupied, and the first operation cannot be executed immediately.

For example, the mutual exclusion flag may be a system variable r, and setting the mutual exclusion flag may be understood as setting r to "1" or setting r to "0".

When setting the mutual exclusion flag may be understood as setting r to "1", clearing the mutual exclusion flag may be understood as setting r to "0", or when setting the mutual exclusion flag may be understood as setting r to "0", clearing the mutual exclusion flag may be understood as setting r to "1", or when setting the mutual exclusion flag may be understood as setting r to "on", clearing the mutual exclusion flag may be understood as setting r to "off".

It should be understood that, that the mutual exclusion flag is a system variable, setting the mutual exclusion flag is understood as setting the system variable to "1" or "0", and clearing the mutual exclusion flag is understood as setting the system variable to "1" or "0" is merely an example, and this does not constitute any limitation on the protection scope of this disclosure. Another mark that can indicate whether the critical resource in the system is occupied also falls within the protection scope of this disclosure.

In addition, it should be noted that, in this disclosure, that an identifier that can identify whether the critical resource in the system is occupied is referred to as a "mutual exclusion flag" is merely an example, and the identifier may be further referred to as a "mutual exclusion identifier", a "critical region identifier", a "critical flag", or the like. A name of information is not limited in this disclosure.

In possibility 1, after the first interrupt request is received, it is further necessary to determine whether a mutual exclusion flag is set in the system. Further, it is determined, based on a mutual exclusion flag that is set in the system, that the first operation cannot be executed immediately. That a mutual exclusion flag is set in the system may be understood as that the system is executing a second operation before the first interrupt request is received, and executing a second operation has occupied the critical resource. No mutual exclusion flag is set in the system before the second operation is executed. The second operation is executed only after task preemption is disabled and the mutual exclusion flag is set.

Optionally, the second operation is an operation in a task context. For example, the processor is located in the task context, the task context includes a plurality of operations, the second operation is an operation of the plurality of operations, and a critical resource needs to be accessed when executing the second operation.

Optionally, the second operation is an operation in an interrupt context. For example, the processor is located in the interrupt context, the interrupt context includes a plurality of operations, the second operation is an operation of the plurality of operations, and a critical resource needs to be accessed when executing the second operation.

In the embodiment shown in FIG. 3, whether the second operation is an operation in a task context or an operation in an interrupt context is not limited. When the processor executes the second operation, different from the procedure shown in FIG. 2, in the embodiment shown in FIG. 3, the system does not disable the interrupt. That is, the processor may receive an external interrupt request.

Possibility 2: Determine, based on a context corresponding to the first interrupt request being a first interrupt context, to store the first operation into the temporary storage area. The first operation that needs to be executed in the interrupt context is a non-urgent operation, and the non-urgent operation may be understood as another type of operation that does not need to be executed immediately.

In the embodiment shown in FIG. 3, after it is determined that the first operation is an operation that does not need to be executed immediately, the first operation may be stored in a temporary storage area.

S330: Store the first operation into a temporary storage area. The storage area is configured to temporarily store an operation that occupies the critical resource and that a received interrupt request requests to execute.

Further, storing the first operation into a temporary storage area includes, before storing the first operation into a temporary storage area, the system first needs to disable reception of an interrupt request, and determines that the temporary storage area is not full, stores the first operation into a first temporary storage area after determining that the temporary storage area is not full, and enables reception of an interrupt request after storing the first operation into the first temporary storage area.

Although the system needs to disable reception of an interrupt request during storing the first operation into the temporary storage area, a time required for storing the first operation into the temporary storage area is very short, so that impact on timeliness of responding to an external event by the system can be minimized. It should be understood that the first operation is only temporarily stored in the temporary storage area, and still needs to be executed. The first operation is only an operation that does not need to be executed immediately when the first interrupt request is received. Subsequently, the first operation further needs to be read from the temporary storage area to be executed. The method procedure shown in FIG. 3 further includes S340.

S340: Read and execute the first operation from the temporary storage area.

Further, reading and executing the first operation from the temporary storage area includes, before reading the first operation from the temporary storage area, the system first needs to disable reception of an interrupt request, and determines that there is a temporarily stored operation in the temporary storage area, reads the first operation from the first temporary storage area after determines that there is a temporarily stored operation in the temporary storage area, and enables reception of an interrupt request after reads the first operation from the first temporary storage area. Finally, the system executes the first operation read from the temporary storage area.

Corresponding to possibility 1 and possibility 2 in S320, reading and executing the first operation from the temporary storage area includes the following two possibilities.

Possibility 1: Corresponding to possibility 1 in S320, the first operation is temporarily stored because a mutual exclusion flag is set in the system in which the second operation is being executed. In this case, reading and executing the first operation from the temporary storage area includes, after executing a second operation ends, reading and executing at least one operation temporarily stored in the temporary storage area, where the at least one operation includes the first operation, and clearing the mutual exclusion flag and enabling the task preemption when all operations in the temporary storage area are read.

In possibility 1, reading and executing the first operation from the temporary storage area may be understood as that at least one operation including the first operation is temporarily stored in the temporary storage area during executing a second operation, and after executing a second operation ends, operations in the temporary storage area need to be read and executed, so that the operations in the temporary storage area can be executed.

Possibility 2: Corresponding to possibility 2 in S320, the first operation is temporarily stored because the first operation is an operation that needs to access a critical resource in an interrupt context. In this case, reading and executing the first operation from the temporary storage area includes the following two manners.

Manner 1: Read and execute the first operation from the temporary storage area after returning to a task from a first interrupt. For example, the first interrupt request is further for requesting to execute a third operation, and the third operation is an operation other than the first operation that does not need to access the critical resource. In manner 1, reading and executing the first operation from the temporary storage area includes executing the third operation, and when executing the third operation ends, determining to return a second interrupt context corresponding to a second interrupt request or determining to return a task context, where a priority of the second interrupt request is lower than a priority of the first interrupt request, and when determining to return the task context and the task context indicates that the executed operation does not occupy the critical resource, setting a mutual exclusion flag, reading and executing at least one operation temporarily stored in the temporary storage area, where the at least one operation includes the first operation, and clearing the mutual exclusion flag when all operations in the temporary storage area are read.

In manner 1, reading and executing the first operation from the temporary storage area may be understood as that when the first interrupt request is returned to the task context, if an operation that needs to be executed in the task context does not occupy the critical resource, an operation that needs to occupy the critical resource and that is temporarily stored in the temporary storage area may be executed.

Manner 2: Receive another task request, and read and execute the first operation from the temporary storage area after executing a fourth operation the task request requests to execute ends. For example, before or after receiving a first interrupt request, the system receives a task request, where the task request is for requesting to execute a fourth operation, and requesting to execute a fourth operation includes requesting to occupy the critical resource, and determines, based on a context corresponding to the task request being a task context, to disable task preemption and set the mutual exclusion flag, and executes the fourth operation. In manner 2, reading and executing the first operation from the temporary storage area includes, after executing the fourth operation ends, reading and executing at least one operation temporarily stored in the temporary storage area, where the at least one operation includes the first operation, and clearing the mutual exclusion flag when all operations in the temporary storage area are read.

In manner 2, reading and executing the first operation from the temporary storage area may be understood as that after the first operation is temporarily stored, the first operation may be executed after executing the operation that needs to be executed in the task context ends.

For example, in possibility 2 of S340, in the procedure of reading and executing the first operation from the temporary storage area, when the system includes a plurality of processors, a spin lock needs to be obtained before the mutual exclusion flag is set (as shown in manner 1: when it is determined to return the task context and the task context indicates that the executed operation does not occupy the critical resource, and before the mutual exclusion flag is set, and/or as shown in manner 1: before it is determined, based on a context corresponding to the task request being a task context, to disable task preemption and set the mutual exclusion flag), where the spin lock is configured to prevent a plurality of processors from performing parallel processing. In addition, the spin lock needs to be released after the mutual exclusion flag is cleared (as shown in manner 1 and manner 2: when all operations in the temporary storage area are read, and before the mutual exclusion flag is cleared).

To facilitate understanding of the method for processing an interrupt request shown in FIG. 3, the following describes a processing procedure for an operation with reference to FIG. 4 to FIG. 9.

Figure 4:
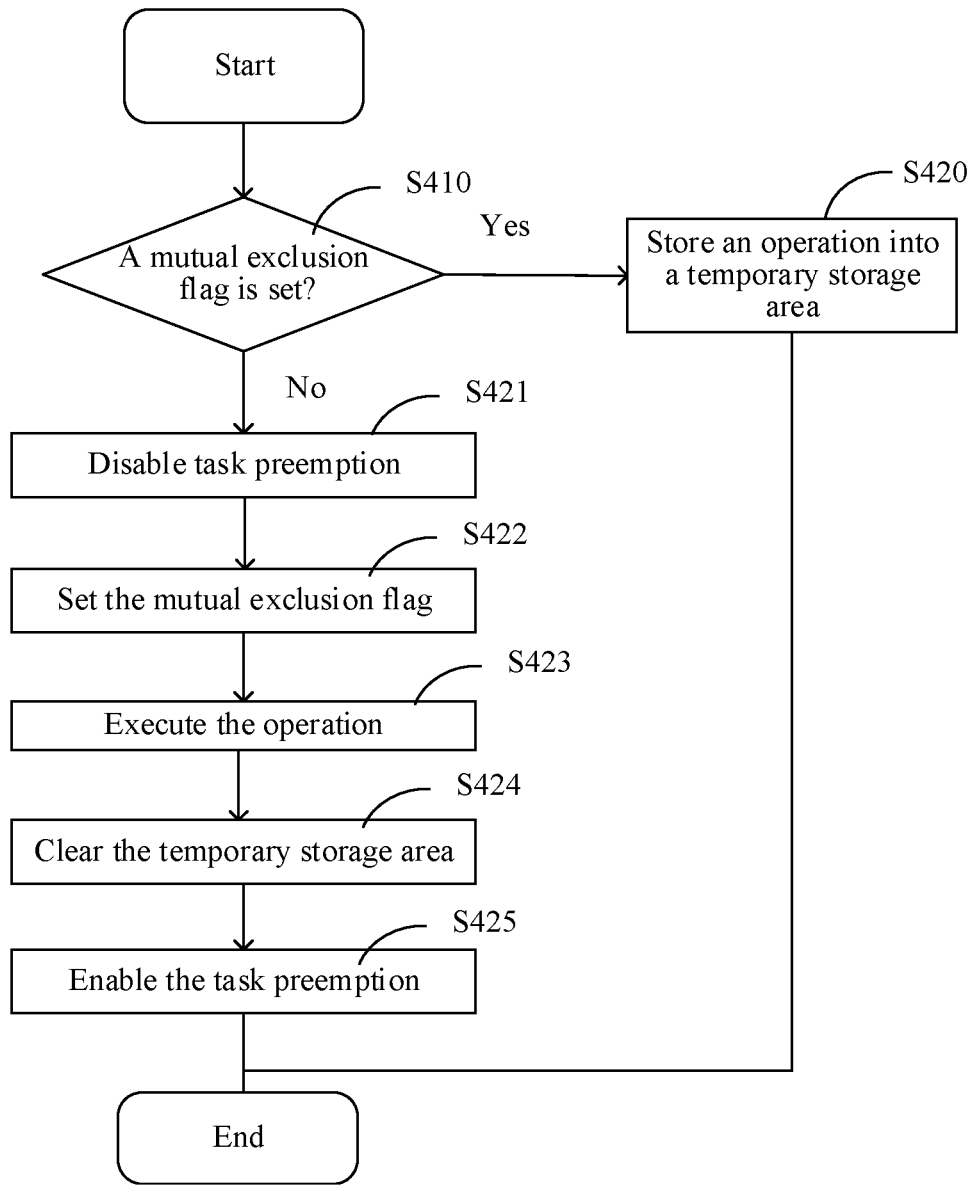
FIG. 4 is a schematic flowchart of operation processing according to an embodiment of this disclosure.

Corresponding to possibility 1 of S320 or S340, a procedure of determining a processing manner for an operation based on whether a mutual exclusion flag is set in the system is described in detail with reference to FIG. 4. Further, there is an operation to be executed (which may be an operation that needs to be executed in the task context or an operation that needs to be executed in the interrupt context) in the system, and the processor needs to access a critical resource when executing the operation. FIG. 4 is a schematic flowchart of operation processing according to an embodiment of this disclosure.

The processing procedure includes at least some of the following steps.

S410: Determine whether a mutual exclusion flag is set.

When a mutual exclusion flag is set in the system, the operation needs to be temporarily stored into the temporary storage area, and S420 is performed.

When no mutual exclusion flag is set in the system, the operation does not need to be temporarily stored into the temporary storage area, and S421, S422, S423, S424, and S425 are performed.

S420: Store the operation into the temporary storage area, in other words, insert the operation into the temporary storage area.

For example, storing the operation into the temporary storage area may be referred to as temporarily storing an operation.

It should be noted that, within the time period a mutual exclusion flag is set in the system, there may be a plurality of operations that need to be temporarily stored in the temporary storage area.

Alternatively, within the time period a mutual exclusion flag is set in the system, there may be no operation that needs to be temporarily stored in the temporary storage area.

S421: Disable task preemption. When no mutual exclusion flag is set in the system, task preemption needs to be disabled, to enable the operation that occupies the critical resource to be executed as soon as possible.

S422: Set the mutual exclusion flag.

The mutual exclusion flag is set after the task preemption is disabled.

It may be understood that the critical resource in the system is not occupied when executing the operation needs to access the critical resource. Before executing the operation starts, a mutual exclusion flag needs to be set, to know that the critical resource is occupied when another operation (at least one operation mutually exclusive with the operation) that needs to occupy the critical resource needs to be executed.

S423: Execute the operation after the mutual exclusion flag is set.

How to execute an operation that occupies the critical resource is not limited in this embodiment of this disclosure. Refer to execution of an operation of mutually exclusive operations in the art. Different from execution of mutually exclusive operations in the art, interrupt does not need to be disabled before the mutually exclusive operations are executed in this disclosure.

S424: Clear the temporary storage area after executing the operation ends.

Clearing the temporary storage area means reading and executing at least one operation temporarily stored in the temporary storage area.

It should be understood that, during executing the operation, at least one operation mutually exclusive with the operation may need to be executed. However, because the operation is being executed in the system, the at least one operation needs to be temporarily stored into the temporary storage area. After executing the operation ends, the operation in the temporary storage area needs to be read and executed. After all operations that are temporarily stored in the temporary storage area are read and executed, the mutual exclusion flag is cleared.

In addition, it should be noted that, during executing the operation, it is possible that no operation mutually exclusive with the operation needs to be executed. Therefore, when S424 is performed, it may be determined that the temporary storage area includes no temporarily stored operation.

Further, after the mutual exclusion flag is cleared, task preemption needs to be enabled. The method procedure shown in FIG. 4 further includes the following steps.

S425: Enable task preemption.

This embodiment of this disclosure mainly focuses on how to execute the operation in the temporary storage area when executing the operation ends and an operation mutually exclusive with the operation is temporarily stored in the temporary storage area.

For example, reading and executing at least one operation temporarily stored in the temporary storage area until the temporary storage area includes no temporarily stored operation may be understood as clearing the temporary storage area.

Further, when an interrupt context or a task context is in a phase of S423 and S424, it means that an interrupt context or a task context is in a critical region in this embodiment of this disclosure.

Corresponding to possibility 2 of S320 and S340, a procedure of determining a processing manner for an operation based on whether a context corresponding to a current request (an interrupt request or a task request) is an interrupt context is described in detail with reference to FIG. 5.

Further, there is an operation to be executed (which may be an operation that needs to be executed in the task context or an operation that needs to be executed in the interrupt context) in the system, and the processor needs to access a critical resource when executing the operation. FIG. 5 is a schematic flowchart of another operation processing according to an embodiment of this disclosure.

The processing procedure includes at least some of the following steps.

S510: Determine whether a request is an interrupt request, or determine whether a context corresponding to a current request is an interrupt context.

When a request is an interrupt request (or a context is an interrupt context), the operation needs to be temporarily stored into the temporary storage area, and S520 is performed, or when a request is a task request (or a context is a task context), S521, S522, S523, S524, and S526 are performed, or the method is applied to a multi-core system, and when a request is a task request (or a context is a task context), the operation does not need to be temporarily stored into the temporary storage area, and S521, S522, S523, S524, S525, and S526 are performed.

S520: Store the operation into the temporary storage area, in other words, insert the operation into the temporary storage area.

For example, storing the operation into the temporary storage area may be referred to as temporarily storing an operation.

It should be noted that a plurality of operations among the operations that the interrupt request requests to execute may need to be temporarily stored in the temporary storage area S521: Disable task preemption.

For description of that disable task preemption in S521, refer to description of S421. Details are not described herein again.

S522: Set the mutual exclusion flag.

For description of that set the mutual exclusion flag in S522, refer to description of S422. Details are not described herein again.

Figure 5:
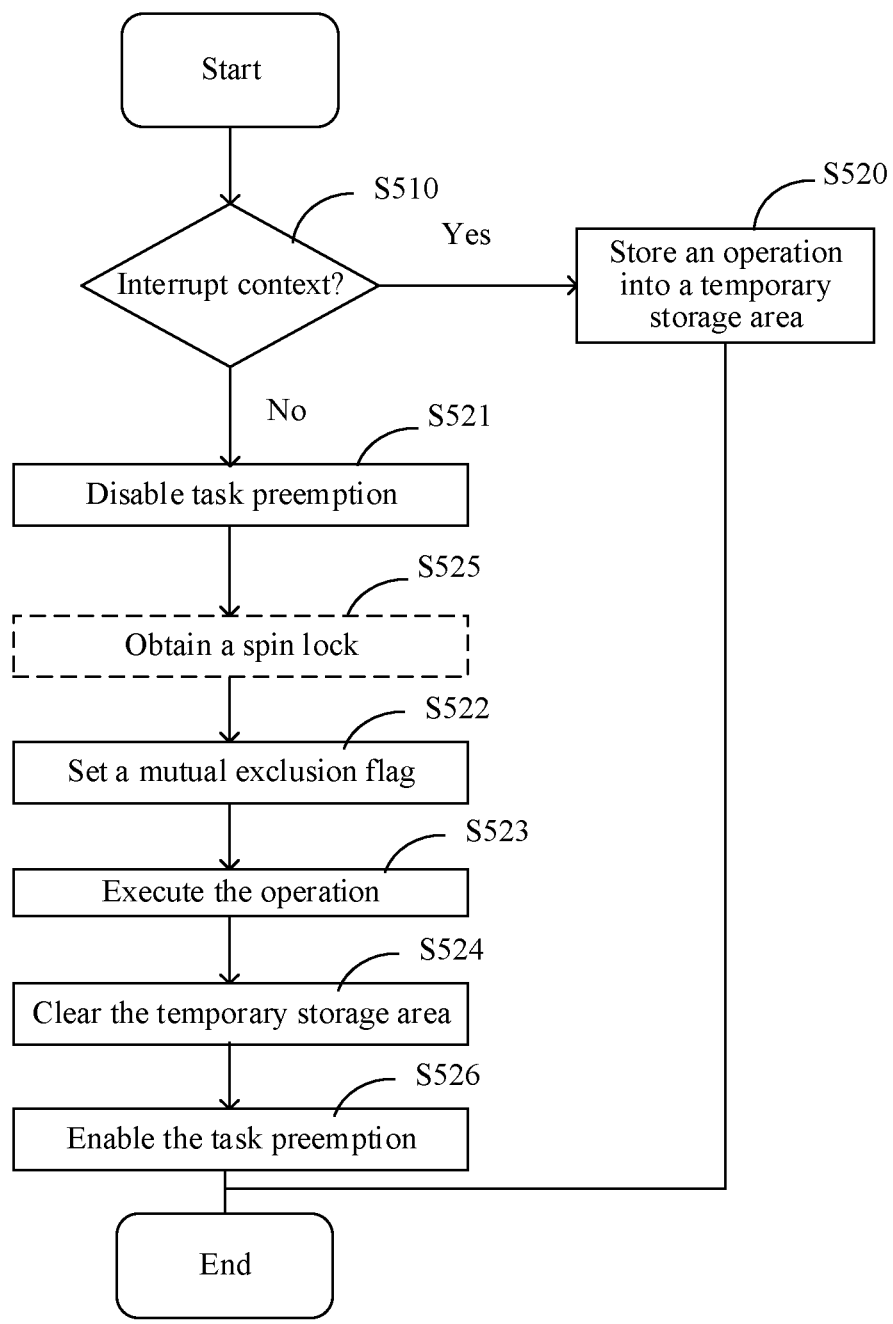
FIG. 5 is a schematic flowchart of another operation processing according to an embodiment of this disclosure.

Optionally, the method for processing an interrupt request shown in FIG. 5 may be further applied to a multi-core system. To prevent a plurality of processors from performing parallel processing, a spin lock may be obtained to prevent another processor other than the current processor from occupying the critical resource. Further, the spin lock is obtained after the processor disables task preemption and before the mutual exclusion flag is set. The spin lock is released after the mutual exclusion flag is cleared. When the system includes a plurality of processors (multi-core), after S521 is performed and before S522 is performed, the following steps are further performed:

S525: Obtain a spin lock.

S523: Execute the operation after the mutual exclusion flag is set.

For description of that execute the operation in S523, refer to description of S423. Details are not described herein again.

S524: Clear the temporary storage area after executing the operation ends.

For description of that clear the temporary storage area in S524, refer to description of S424. Details are not described herein again.

S526: Enable the task preemption after the temporary storage area is cleared.

For description of that enable task preemption in S526, refer to description of S425. Details are not described herein again.

It should be understood that in the method shown in FIG. 5, when a processing procedure for an operation is determined based on whether a context corresponding to a current request is an interrupt context, it is necessary to determine whether to return another interrupt or to return a task when processing a current interrupt ends. For example, if there are a plurality of interrupts with different priorities, it is necessary to return from a high-priority interrupt to a low-priority interrupt.

For example, the processor needs to determine to return an interrupt context corresponding to another interrupt request or determine to return a task context, where a priority of the interrupt request is lower than a priority of the interrupt request that is being processed.

When determining to return the task context and the task context indicates that the executed operation does not occupy the critical resource, the processor sets a mutual exclusion flag, reads and executes at least one operation temporarily stored in the temporary storage area, where the at least one operation includes the first operation, and clears the mutual exclusion flag when all operations in the temporary storage area are read.

Figure 6:
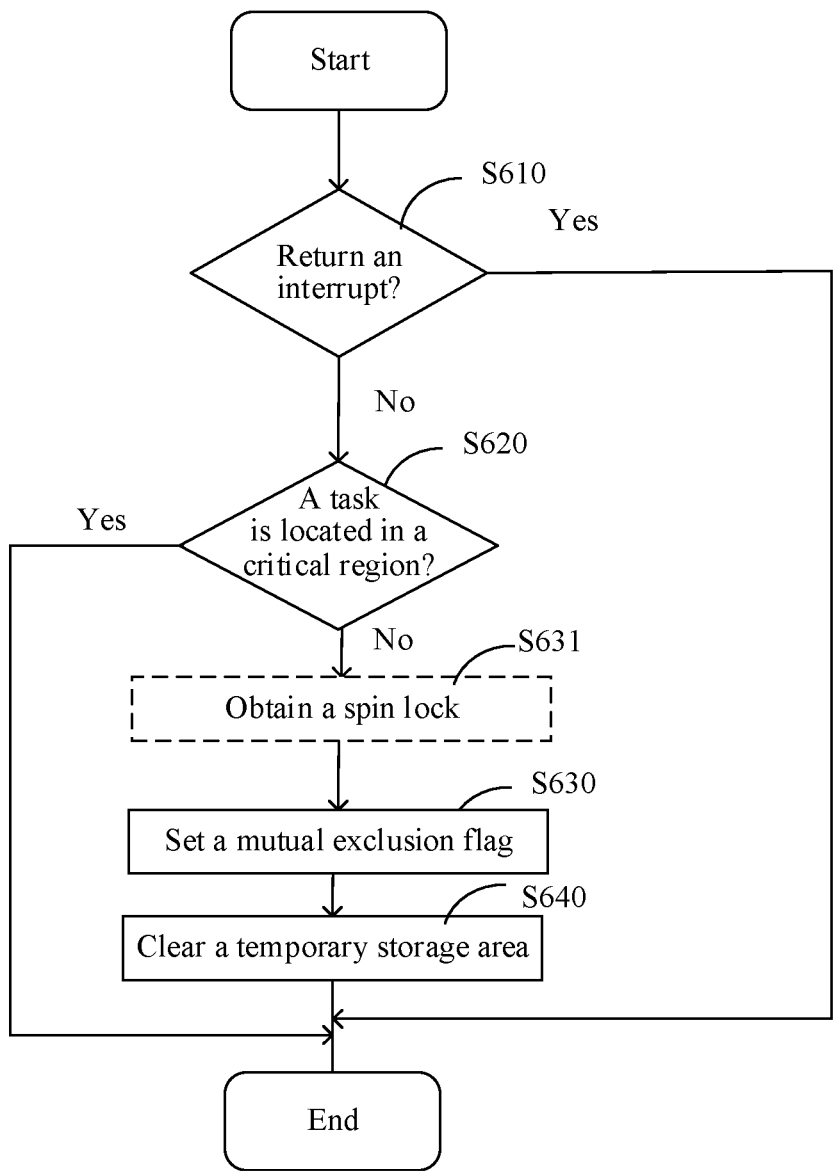
FIG. 6 is a schematic flowchart of returning an interrupt according to an embodiment of this disclosure.

A procedure of returning a low-priority interrupt or returning a task after processing an interrupt ends is described in detail with reference to FIG. 6. FIG. 6 is a schematic flowchart of interrupt return according to an embodiment of this disclosure, including some of the following steps.

S610: Determine whether to return an interrupt.

When an interrupt is returned, the procedure ends, or when a task is returned, S620 is performed, or when a task is returned, S620, S630, and S640 are performed, or the method is applied to a multi-core system, and when a task is returned, S620, S630, S631, and S640 are performed.

S620: Return a task context and determine whether the task context is located in a critical region.

When the task context is located in the critical region, the procedure ends, or when the task context is not located in the critical section, S630 and S640 are performed, or when the task context is not located in the critical region and the method is applied to the multi-core system, S630, S631, and S640 are performed.

It should be noted that, if a current task context is located in the critical region, it indicates that the current task context is executing an operation that accesses the critical resources. That is, a mutual exclusion flag is set in the system.

S630: Set the mutual exclusion flag.

For description of that set the mutual exclusion flag in S630, refer to description of S422. Details are not described herein again.

Optionally, the method for processing an interrupt request shown in FIG. 6 may be further applied to a multi-core system. To prevent a plurality of processors from performing parallel processing, a spin lock may be obtained to prevent another processor other than the current processor from occupying the critical resource. Further, the spin lock is obtained after the processor disables task preemption and before the mutual exclusion flag is set. The spin lock is released after the mutual exclusion flag is cleared. When the system includes a plurality of processors (multi-core), after S630 is performed and before S640 is performed, the following steps are further performed:

S631: Obtain a spin lock.

S640: Clear the temporary storage area after the mutual exclusion flag is set.

For description of that clear the temporary storage area in S640, refer to description of S424. Details are not described herein again.

Figure 7A:
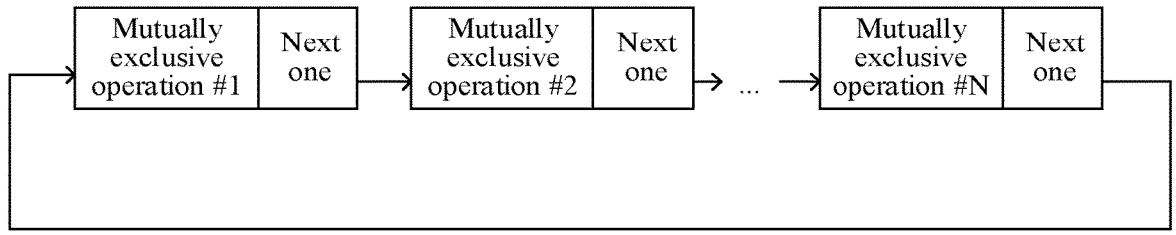
FIG. 7A and FIG. 7B are schematic diagrams of temporarily storing an operation according to an embodiment of this disclosure.
Figure 7B:
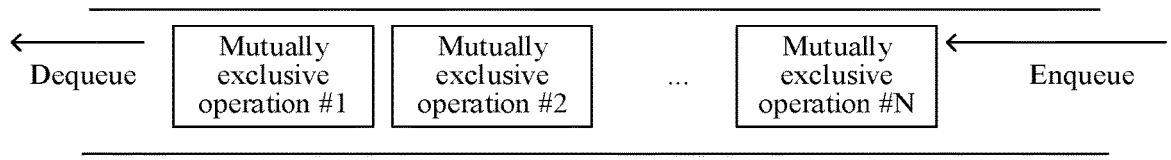

It can be known from the method procedures shown in FIG. 4 and FIG. 5, when some conditions (as the condition shown in FIG. 4: a mutual exclusion flag is set in the system, and/or as the condition shown in FIG. 5: the current request is an interrupt request) are satisfied, the operation needs to be temporarily stored into the temporary storage area (as shown in FIG. 4: S420: Store the operation into the temporary storage area, in other words, insert the operation into the temporary storage area, and/or as shown in FIG. 5: S520: Store the operation into the temporary storage area, in other words, insert the operation into the temporary storage area). In addition, a plurality of operations may need to be temporarily stored into the temporary storage area. The following describes in detail how to temporarily store the operation with reference to FIGS. 7A and 7B and FIG. 8. First, how to temporarily store an operation when at least one operation needs to be stored into the temporary storage area is briefly described with reference to FIGS. 7A and 7B. FIGS. 7A and 7B are schematic diagrams of temporarily storing an operation according to an embodiment of this disclosure.

In a possible implementation, how to store at least one operation into the temporary storage area is shown in FIG. 7A. It can be learned from FIG. 7A that N operations enter a linked list of operation in a pointer-linked order, to implement temporary storage of the operations.

In another possible implementation, how to store at least one operation into the temporary storage area is shown in FIG. 7B. It can be learned from FIG. 7B that N operations sequentially enter an operation queue through an enqueuing operation, to implement temporary storage of the operations.

It should be understood that FIGS. 7A and 7B merely illustrates how to temporarily store an operation, and does not constitute any limitation on the protection scope of this disclosure. Alternatively, the operation may be temporarily stored into the temporary storage area in another possible way. The temporary storage area may be understood as a resource, and is used to temporarily store an operation that cannot be immediately executed.

For example, storing an operation into the temporary storage area is understood as temporarily storing an operation, and time overheads of temporarily storing an operation are low, thereby ensuring timeliness of responding by the system.

Figure 8:
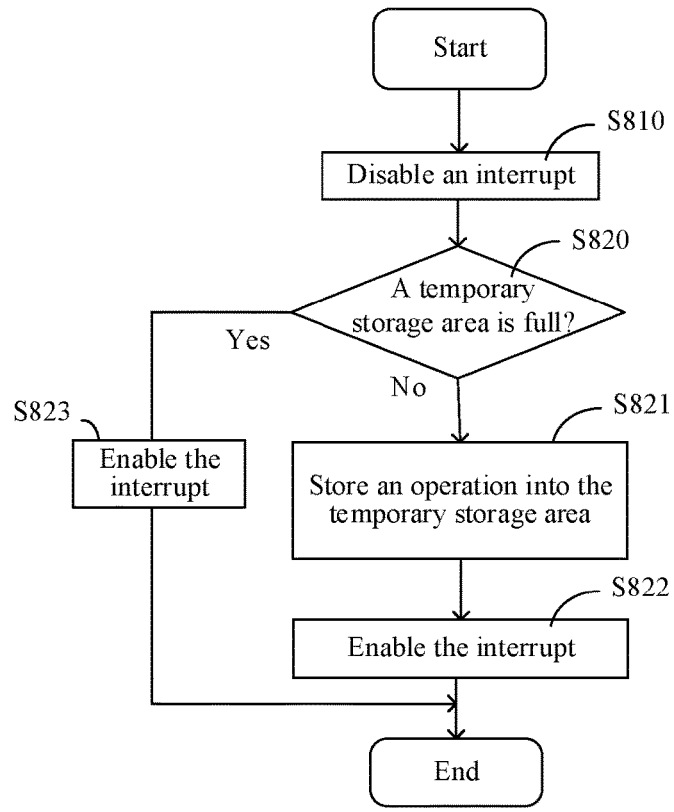
FIG. 8 is a schematic flowchart of temporarily storing an operation according to an embodiment of this disclosure.

Second, how to store an operation into the temporary storage area is described in detail with reference to FIG. 8. FIG. 8 is a schematic flowchart of temporarily storing an operation according to an embodiment of this disclosure, including some of the following steps.

S810: Before temporarily store an operation, disable an interrupt.

It should be understood that temporarily storing an operation by storing an operation into the temporary storage area may also be understood as that an operation that needs to occupy a critical resource and an operation that needs to occupy a critical resource in an interrupt context are mutually exclusive. Therefore, an interrupt needs to be disabled before the temporarily storing an operation.

The operation may be any one of the at least one operation.

S820: After the disabling an interrupt, determine whether the temporary storage area is full.

When the temporary storage area is not full, S821 and S822 are performed, or when the temporary storage area is full, S823 is performed.

S821: Store an operation into the temporary storage area when it is determined that the temporary storage area is not full and is able to temporarily store an operation.

For example, storing an operation into the temporary storage area includes obtaining a computer node and recording the operation in the computer node. The computer node is configured to record an operation that needs to be temporarily stored. The obtaining a computer node in this embodiment of this disclosure may be understood as obtaining a node that stores an operation, or as obtaining a storage space for storing an operation. Recording the operation in the computer node may be understood as temporarily storing the operation into the temporary storage area.

After storing the operation into the temporary storage area, S823 is performed. If the temporary storage area is full when enabling the interrupt, S823 is performed to enable the interrupt.

For example, when the temporary storage area is full, indication information may be further returned, and the indication information indicates that an error occurs in the system.

It should be noted that an interrupt needs to be disabled in the process of temporarily storing an operation. However, a duration required for temporarily storing an operation is very short (the operation is not executed currently and is only temporarily stored in the temporary storage area, and after the temporarily storing ends, the interrupt is enabled), which has little impact on timeliness of the system.

Figure 9:
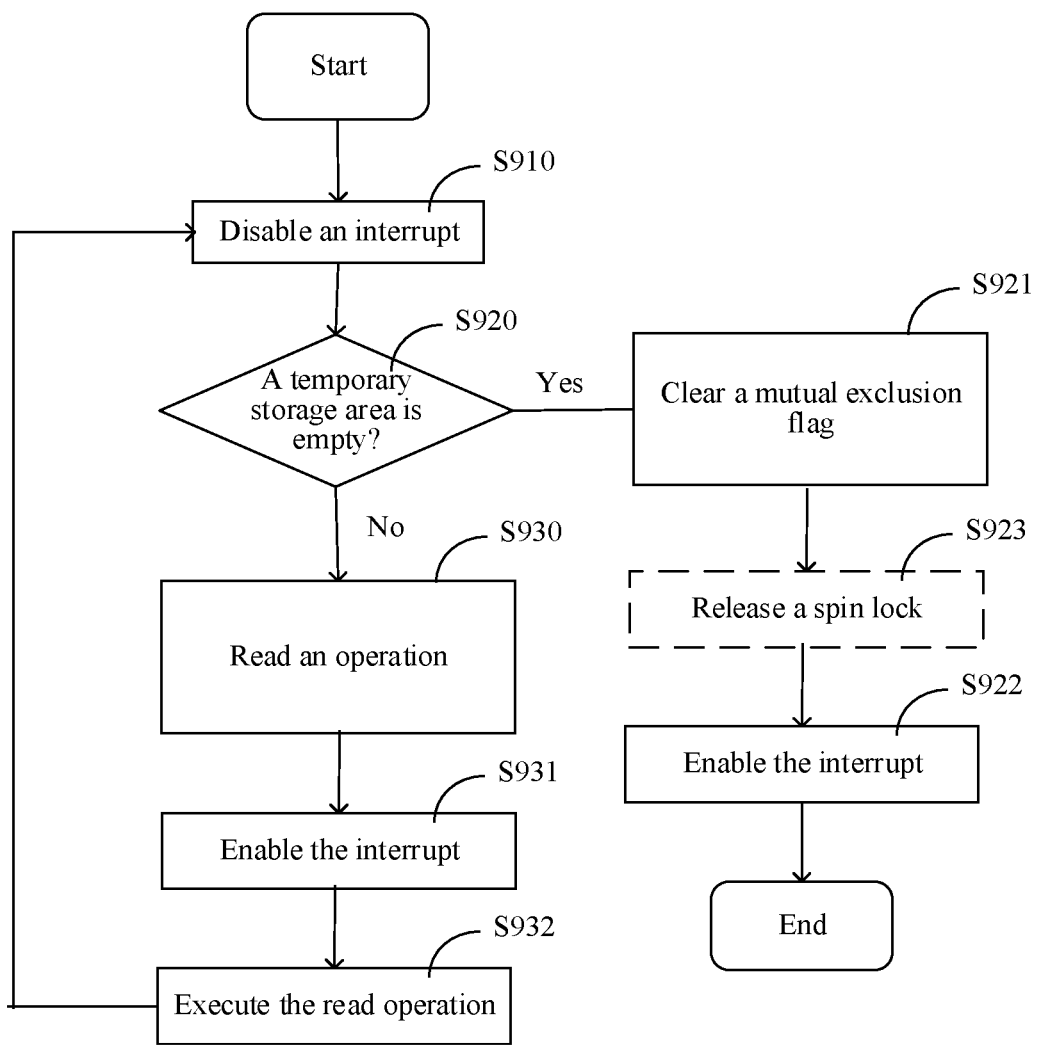
FIG. 9 is a schematic flowchart of clearing a temporary storage area according to this disclosure.

In addition, the method procedures shown in FIG. 4 and FIG. 5 both include the step of clearing the temporary storage area (as shown in FIG. 4: S424: Clear the temporary storage area after executing the operation ends, and/or as shown in FIG. 5: S524: Clear the temporary storage area after executing the operation ends). The following describes how to clear the temporary storage area in detail with reference to FIG. 9. FIG. 9 is a schematic flowchart of clearing a temporary storage area according to this disclosure, including at least some of the following steps.

S910: Before reading an operation from the temporary storage area, disable an interrupt.

It should be understood that reading an operation by reading an operation from the temporary storage area may also be understood as that an operation that needs to occupy a critical resource and an operation that needs to occupy a critical resource in an interrupt context are mutually exclusive. Therefore, an interrupt needs to be disabled before reading an operation.

S920: After the disabling an interrupt, determine whether the temporary storage area is empty.

When the temporary storage area is empty, it indicates that all operations in the temporary storage area are executed, and currently the system includes no operation that needs to occupy the critical resource. Therefore, the mutual exclusion flag should be cleared, and S921 and S922 are performed, or when the temporary storage area is empty and the method is applied to the multi-core system, S921, S922, and S923 are performed, or when the temporary storage area is not empty, S930, S931, and S932 are performed.

=S5921: Clear the mutual exclusion flag after determining that no operation is temporarily stored in the temporary storage area.

S922: Enable the interrupt after the mutual exclusion flag is cleared.

Optionally, the method for processing an interrupt request shown in FIG. 9 may also be applied to the multi-core system. It can be learned from the method procedures shown in FIG. and FIG. 6, when the method for processing an interrupt request is applied to the multi-core system, a processor needs to obtain a spin lock before setting the mutual exclusion flag. When a processor obtains a spin lock, the processor needs to release the spin lock after the mutual exclusion flag is cleared. That is, after S921 is performed and before S922 is performed, the method procedure shown in FIG. 9 may further include S923: Release the spin lock.

S930: Read an operation after determining that an operation is temporarily stored in the temporary storage area.

When there is at least one operation that is temporarily stored in the temporary storage area, an operation may be read from the temporary storage area. S931: Enable the interrupt after the operation is read from the temporary storage area.

It can be understood that after the operation is read from the temporary storage area, the interrupt is enabled to respond to other interrupts to ensure timeliness of the system.

S932: Execute the read operation.

Further, the operation is executed after the operation in the temporary storage area is read.

It should be noted that another operation that has not been executed may further be temporarily stored in the temporary storage area. After S932 is performed, S910 is performed, and the steps S920, S930, S931, and S932 are performed until the temporary storage area is empty.

Sequence numbers of the foregoing processes do not mean execution sequences in the foregoing method embodiments. The execution sequences of the processes should be determined based on functions and internal logic of the processes, and should not be construed as any limitation on the implementation processes of embodiments of this disclosure. In addition, it is possible that not all operations in the foregoing method embodiments need to be performed.

It should be understood that the operating system in the foregoing method embodiments may perform some or all of the steps in embodiments. These steps or operations are merely examples. Embodiments of this disclosure may further include performing other operations or variations of various operations.

It should be further understood that in various embodiments of this disclosure, unless otherwise specified or logically conflicted, terms and/or descriptions in different embodiments may be consistent and may be referenced by each other. The technical features in different embodiments may be combined to form a new embodiment according to their internal logical relationships.

The foregoing describes in detail the method for processing an interrupt request according to embodiments of this disclosure with reference to FIG. 3 to FIG. 9. The following describes in detail an apparatus for processing an interrupt request provided in embodiments of this disclosure with reference to FIG. 10 and FIG. 11.

Figure 10:
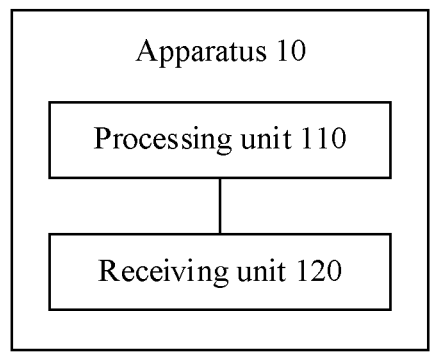
FIG. 10 is a schematic diagram of an apparatus for processing an interrupt request according to this disclosure.

Refer to FIG. 10. FIG. 10 is a schematic diagram of an apparatus 10 for processing an interrupt request according to this disclosure. As shown in FIG. 10, the apparatus 10 includes a processing unit 110 and a receiving unit 120.

The receiving unit 120 is configured to receive a first interrupt request, where the first interrupt request is for requesting to execute a first operation, requesting to execute a first operation includes requesting to occupy a critical resource, and the critical resource cannot be simultaneously occupied by a plurality of operations.

The processing unit 110 is configured to determine, based on at least the first interrupt request, that the first operation is an operation that does not need to be executed immediately, and store the first operation into a temporary storage area.

The temporary storage area is configured to store an operation that occupies the critical resource and that a received interrupt request requests to execute.

Before the receiving unit receives the first interrupt request, the apparatus further includes an execution unit configured to execute a second operation, where executing a second operation includes occupying the critical resource, where that a processing unit 110 is configured to determine, based on at least the first interrupt request, that the first operation does not need to be executed immediately, and store the first operation into a temporary storage area further includes that the processing unit 110 determines, based on a mutual exclusion flag that is set in an operating system, that the first operation cannot be executed immediately, and stores the first operation into the temporary storage area, where the mutual exclusion flag indicates that the critical resource is occupied.

That a processing unit 110 is configured to determine, based on at least the first interrupt request, that the first operation does not need to be executed immediately, and store the first operation into a temporary storage area further includes that the processing unit 110 is configured to determine, based on a context corresponding to the first interrupt request being a first interrupt context, to store the first operation into the temporary storage area.

Before the execution unit executes the second operation, the processing unit 110 is further configured to determine that the mutual exclusion flag is not set in the operating system, and the processing unit 110 is further configured to disable task preemption and set the mutual exclusion flag.

After execution of the second operation by the execution unit ends, the processing unit 110 is further configured to read and execute at least one operation temporarily stored in the temporary storage area, where the at least one operation includes the first operation, and the processing unit 110 is further configured to clear the mutual exclusion flag and enable the task preemption when the temporary storage area includes no operation.

The apparatus 10 corresponds to the processor in the method embodiments at all, and the apparatus 10 may be a processor in the single-core system in the method embodiments. Alternatively, the apparatus 10 may be a processor of the plurality of processors in the multi-core system in the method embodiments. Alternatively, the apparatus 10 may be a chip or a functional module of the processor. Corresponding units of the apparatus 10 are configured to perform corresponding steps performed by the processor in the method embodiments shown in FIG. 3 to FIG. 9.

The processing unit 110 in the apparatus 10 performs the internal implementation or the processing step in the method embodiments. The receiving unit 120 performs the receiving step in the method embodiments. The apparatus 10 may further include a sending unit configured to perform a sending step, for example, send information to another device. The sending unit and the receiving unit 120 may form a transceiver unit, which has both receiving and sending functions. The sending unit may be a transmitter, and the receiving unit 120 may be a receiver. The receiver and the transmitter may be integrated together to form a transceiver.

Figure 11:
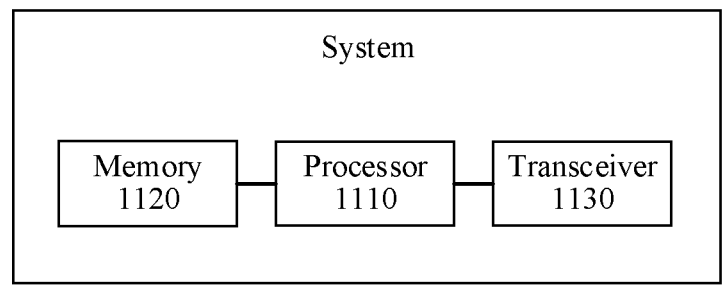
FIG. 11 is a schematic diagram of a structure of a system applicable to embodiments of this disclosure.

Refer to FIG. 11. FIG. 11 is a schematic diagram of a structure of a system applicable to embodiments of this disclosure. For ease of description, FIG. 11 shows only main components of the system. As shown in FIG. 11, the system includes a processor 1110, a memory 1120, and a transceiver 1130. The processor is configured to control the transceiver to send and receive information. The memory is configured to store a computer program. The processor is configured to invoke the computer program from the memory and run the computer program, to perform a corresponding procedure and/or operation performed by a first operating system in the method for accessing, by the first operating system, resources of a second operating system according to this disclosure. Details are not described herein.

A person skilled in the art may understand that, for ease of description, FIG. 11 shows only one memory and one processor. In an actual system, there may be a plurality of processors and memories. The memory may also be referred to as a storage medium, a storage device, or the like. This is not limited in embodiments of this disclosure.

An embodiment of this disclosure further provides an electronic device, including the foregoing system.

This disclosure further provides a computer-readable storage medium. The computer-readable storage medium stores instructions. When the instructions run on a computer, the computer is enabled to perform the method shown in FIG. 3 to FIG. 9.

This disclosure further provides a computer program product including instructions. When the computer program product is run on a computer, the computer is enabled to perform the method shown in FIG. 3 to FIG. 9.

This disclosure further provides a chip, including a processor. The processor is configured to read and run a computer program stored in the memory, to perform the method for processing an interrupt request provided in this disclosure. Optionally, the chip further includes a memory, the processor is connected to the memory over a circuit or a wire, and the processor is configured to read and execute a computer program in the memory. Further, optionally, the chip further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface, an interface circuit, an output circuit, an input circuit, a pin, a related circuit, or the like on the chip. The processor may alternatively be embodied as a processing circuit or a logic circuit.

It should be understood that the chip may alternatively be replaced with a chip system, and details are not described herein again.

The terms "include", "contain" and any other variants thereof in this disclosure are intended to cover non-exclusive inclusion. For example, a process, method, system, product, or device that includes a series of steps or units are not limited to those steps or units that are clearly listed, but may include other steps or units that are not explicitly listed or are inherent to such a process, method, system, product, or device.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, a Universal Serial Bus (USB) flash drive, a removable hard disk, a ROM), a RAM, a magnetic disk, an optical disc, and the like.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:
   receiving a first interrupt request requesting to execute a first operation, wherein requesting to execute the first operation comprises requesting to occupy a critical resource that cannot be simultaneously occupied by a plurality of second operations, and wherein the second operations comprise the first operation;
   storing, when the first operation is not to be executed immediately, the first operation into a temporary storage area storing an operation that occupies the critical resource and that a received interrupt request requests to execute,
   wherein storing the first operation into the temporary storage area is based on a context corresponding to the first interrupt request being a first interrupt context; and
   wherein the first interrupt request is further for requesting to execute a third operation different from the first operation, and wherein the method further comprises:
   executing the third operation;
   when executing the third operation has ended:
      return a second interrupt context corresponding to a second interrupt request; or
      return a task context, wherein a second priority of the second interrupt request is lower than a first priority of the first interrupt request; and
   wherein to return the task context and the task context indicates that the third operation does not occupy the critical resource includes:
      setting a mutual exclusion flag;
      reading and executing at least one operation temporarily stored in the temporary storage area, wherein the at least one operation comprises the first operation; and
   clearing the mutual exclusion flag when the temporary storage area does not comprise a remaining operation.

2. The method of claim 1, wherein before receiving the first interrupt request, the method further comprises:
   executing a fourth operation by occupying the critical resource;
   determining, based on the mutual exclusion flag that is set in an operating system, that the first operation cannot be executed immediately, wherein the mutual exclusion flag indicates that the critical resource is occupied; and
   further storing, in response to determining that the first operation cannot be executed immediately, the first operation into the temporary storage area.

3. The method of claim 2, wherein before executing the fourth operation, the method further comprises:
   when the mutual exclusion flag is not set in the operating system:
      disabling task preemption; and
      setting the mutual exclusion flag.

4. The method of claim 3, wherein after executing the fourth operation, the method further comprises:
reading and executing at least one fifth operation temporarily stored in the temporary storage area, wherein the at least one fifth operation comprises the first operation; and
when the temporary storage area does not comprise a remaining operation:
clearing the mutual exclusion flag; and
enabling the task preemption.

5. The method of claim 4, further comprising:
disabling reception of a third interrupt request;
determining that the temporary storage area temporarily stores the at least one fifth operation;
reading a sixth operation from the temporary storage area;
enabling reception of the third interrupt request; and
executing the sixth operation, wherein the sixth operation is one of the at least one fifth operation.

6. The method of claim 1, wherein before setting the mutual exclusion flag, the method further comprises obtaining a spin lock, and wherein the spin lock prevents a plurality of processors from performing parallel processing.

7. The method of claim 1, further comprising:
receiving a task request requesting to execute a fourth operation, wherein requesting to execute the fourth operation comprises requesting to occupy the critical resource;
disabling task preemption and setting a mutual exclusion flag in an operating system based on a context corresponding to the task request being a task context, wherein the mutual exclusion flag indicates that the critical resource is occupied; and
executing the fourth operation,
wherein after executing the fourth operation has ended, the method further comprises:
reading and executing at least one operation temporarily stored in the temporary storage area; and
clearing the mutual exclusion flag when the temporary storage area does not comprise a remaining operation.

8. The method of claim 1, wherein before storing the first operation into the temporary storage area, the method further comprises:
disabling reception of a third interrupt request; and
enabling reception of the second interrupt request when the temporary storage area is not full and after storing the first operation into the temporary storage area.

9. An apparatus comprising:
a memory configured to store instructions; and
one or more processors coupled to the memory and configured to execute the instructions to cause the apparatus to:
receive a first interrupt request requesting to execute a first operation, wherein requesting to execute the first operation comprises requesting to occupy a critical resource that cannot be simultaneously occupied by a plurality of second operations, and wherein the second operations comprise the first operation;
store, when the first operation is not to be executed immediately, the first operation into a temporary storage area storing an operation that occupies the critical resource and that a received interrupt request requests to execute,
wherein storing the first operation into the temporary storage area is based on a context corresponding to the first interrupt request being a first interrupt context; and
wherein the first interrupt request is further for requesting to execute a third operation different from the first operation, and wherein the instructions further cause the apparatus to:
execute the third operation;
when executing the third operation has ended:
return a second interrupt context corresponding to a second interrupt request; or
return a task context, wherein a second priority of the second interrupt request is lower than a first priority of the first interrupt request; and
wherein to return the task context and the task context indicates that the third operation does not occupy the critical resource includes to:
set a mutual exclusion flag;
read and execute at least one operation temporarily stored in the temporary storage area, wherein the at least one operation comprises the first operation; and
clear the mutual exclusion flag when the temporary storage area does not comprise a remaining operation.

10. The apparatus of claim 9, wherein the one or more processors are further configured to execute the instructions to cause the apparatus to:
execute a fourth operation by occupying the critical resource;
determine, based on the mutual exclusion flag that is set in an operating system, that the first operation cannot be executed immediately, wherein the mutual exclusion flag indicates that the critical resource is occupied; and
further store, in response to determining that the first operation cannot be executed immediately, the first operation into the temporary storage area.

11. The apparatus of claim 10, wherein the one or more processors are further configured to execute the instructions to cause the apparatus to:
when the mutual exclusion flag is not set in the operating system:
disable task preemption; and
set the mutual exclusion flag.

12. The apparatus of claim 11, wherein the one or more processors are further configured to execute the instructions to cause the apparatus to:
read and execute at least one fifth operation temporarily stored in the temporary storage area, wherein the at least one fifth operation comprises the first operation; and
when the temporary storage area does not comprise a remaining operation:
clear the mutual exclusion flag; and
enable the task preemption.

13. The apparatus of claim 9, wherein the one or more processors are further configured to execute the instructions to cause the apparatus to obtain a spin lock, and wherein the spin lock is configured to prevent a plurality of second processors from performing parallel processing.

14. The apparatus of claim 9, wherein the one or more processors are further configured to execute the instructions to cause the apparatus to:
receive a task request requesting to execute a fourth operation, wherein requesting to execute the fourth operation comprises requesting to occupy the critical resource;
disable task preemption and set a mutual exclusion flag in an operating system based on a context corresponding to the task request being a task context, wherein the mutual exclusion flag indicates that the critical resource is occupied; and execute the fourth operation, wherein after executing the fourth operation has ended, the one or more processors are further configured to execute the instructions to cause the apparatus to:

read and execute at least one operation temporarily stored in the temporary storage area; and clear the mutual exclusion flag when the temporary storage area does not comprise a remaining operation.

15. The apparatus of claim 9, wherein a structure of the temporary storage area comprises any one of the following:

a linked list structure;

a heap structure; or a queue structure.

16. A computer program product comprising computer-executable instructions that are stored on a non-transitory computer-readable medium and that, when executed by one or more processors, cause an apparatus to:

receive a first interrupt request requesting to execute a first operation, wherein requesting to execute the first operation comprises requesting to occupy a critical resource that cannot be simultaneously occupied by a plurality of second operations, and wherein the second operations comprise the first operation;

store, when the first operation is not to be executed immediately, the first operation into a temporary storage area storing an operation that occupies the critical resource and that a received interrupt request requests to execute;

wherein storing the first operation into the temporary storage area is based on a context corresponding to the first interrupt request being a first interrupt context; and wherein the first interrupt request is further for requesting to execute a third operation different from the first operation, and wherein the instructions further cause the apparatus to:

execute the third operation;

when executing the third operation has ended:

return a second interrupt context corresponding to a second interrupt request; or return a task context, wherein a second priority of the second interrupt request is lower than a first priority of the first interrupt request; and wherein to return the task context and the task context indicates that the third operation does not occupy the critical resource includes to:

set a mutual exclusion flag;

read and execute at least one operation temporarily stored in the temporary storage area, wherein the at least one operation comprises the first operation; and clear the mutual exclusion flag when the temporary storage area does not comprise a remaining operation.

17. The method of claim 1, wherein a structure of the temporary storage area comprises any one of the following:

a linked list structure;

a heap structure; or a queue structure.

18. The computer program product of claim 16, wherein a structure of the temporary storage area comprises any one of the following:

a linked list structure;

a heap structure; or a queue structure.

19. The computer program product of claim 16, wherein the one or more processors are further configured to execute the instructions to cause the apparatus to obtain a spin lock, and wherein the spin lock is configured to prevent a plurality of second processors from performing parallel processing.

20. The computer program product of claim 16, wherein before storing the first operation into the temporary storage area, the instructions, when executed by one or more processors, cause an apparatus to:

disable reception of a third interrupt request; and enable reception of the second interrupt request when the temporary storage area is not full and after storing the first operation into the temporary storage area.

* * * * *